United States Patent
Shankarappa et al.

(10) Patent No.: US 6,266,690 B1
(45) Date of Patent: Jul. 24, 2001

(54) ENHANCED SERVICE PLATFORM WITH SECURE SYSTEM AND METHOD FOR SUBSCRIBER PROFILE CUSTOMIZATION

(75) Inventors: Vijay Shankarappa, San Jose, CA (US); Eric William Burger, McLean, VA (US); John Nestoriak, III, Bethesda, MD (US)

(73) Assignee: ADC Telecommunications, Inc., Minnetonka, MN (US)

( * ) Notice: Subject to any disclaimer, the term of this patent is extended or adjusted under 35 U.S.C. 154(b) by 0 days.

(21) Appl. No.: 09/361,676

(22) Filed: Jul. 27, 1999

Related U.S. Application Data

(63) Continuation-in-part of application No. 09/238,108, filed on Jan. 27, 1999.

(51) Int. Cl.[7] .................................................. G06F 15/16
(52) U.S. Cl. .......................... 709/202; 709/202; 709/203; 709/227; 709/229; 707/1; 707/10; 707/100; 707/200; 455/461; 370/351; 370/385
(58) Field of Search ................................... 709/202–203; 707/1, 10, 100, 200; 455/461; 370/351, 385

(56) References Cited

U.S. PATENT DOCUMENTS

| | | | |
|---|---|---|---|
| 5,610,910 | * | 3/1997 | Focsaneanu et al. ................. 370/351 |
| 5,742,905 | * | 4/1998 | Pepe et al. ........................... 455/461 |
| 5,774,671 | * | 6/1998 | Satoh ................................... 709/231 |
| 5,813,006 | * | 9/1998 | Polnerow et al. ..................... 707/10 |
| 5,867,498 | * | 2/1999 | Gillman et al. ...................... 370/385 |
| 5,881,234 | * | 3/1999 | Schwob ................................ 709/219 |
| 5,898,839 | * | 4/1999 | Berteau ................................ 709/227 |
| 5,958,016 | * | 9/1999 | Chang et al. ........................ 709/229 |

OTHER PUBLICATIONS

PCT/ISA International Search Report, Nov. 24, 2000, International Application No. PCT/US00/20434, 4 Sheets.

* cited by examiner

Primary Examiner—Ayaz Sheikh
Assistant Examiner—Thu Ha Nguyen
(74) Attorney, Agent, or Firm—Pennie & Edmonds LLP

(57) ABSTRACT

An enhanced telephone service system including a subscriber service manager and a customization module. The subscriber service manager is configured to receive subscriber transaction-ID requests, supply transaction identifiers and respond to queries for subscriber profile data. The customization module is configured to receive customization messages. When a customization message includes a transaction identifier, the customization module compares the transaction identifier in the customization message with the transaction identifiers generated by the subscriber service manager. Only if there is a match between the transaction identifiers does the customization module register the customization data. Alternatively, if the customization message does not contain a transaction identifier but does contain a subscriber identifier, the customization module temporarily stores the customization data. When a subscriber logs on to the system and there is pending temporarily stored customization data, the customization module prompts the subscriber for authorization to register the temporarily stored data.

33 Claims, 9 Drawing Sheets

ENHANCED SERVICE PLATFORM WITH SECURE SYSTEM AND METHOD FOR SUBSCRIBER PROFILE CUSTOMIZATION

This application is a continuation-in-part of U.S. patent application Ser. No. 09/238,108, filed Jan. 27, 1999, entitled "Enhanced Telephone Service System With Secure System And Method For E-mail Address Registration."

The present invention relates generally to a subscriber profile customization system and method and more particularly to a secure method for registering subscriber profile data with an enhanced service provider.

BACKGROUND OF THE INVENTION

Registration of subscriber profile data is well known among service providers. Service providers routinely require subscribers to specify subscriber profile data such as a personal E-mail (electronic mail) address. This is typically completed by having the subscriber do one of the following: send an E-mail message containing subscriber profile data to a specified E-mail address; use a web browser, such as Netscape Navigator, to log onto the service provider's web site on the world-wide-web (WWW) to register the data; spell out the data on a telephone keypad; or recite the data to a live operator.

A list server is an example of a service that often requires subscribers to register subscriber profile data such as a personal E-mail address in order to receive mail deliveries. A subscriber is generally required to send an E-mail message to a specified E-mail address, the E-mail message requesting subscription to the list server's services. After receiving the E-mail message, the list-server registers the corresponding E-mail address by storing the network routing information contained in the E-mail message. For more information on list-servers, see *List Owner's Manual for LISTSERV, ver*1.8, L-Soft International, Inc., 1997, which is hereby incorporated by reference for purposes of background information.

The problems associated with known subscriber profile data registration techniques are numerous. For example, notifying a subscriber that the registration attempt was, or was not, successful is often difficult; entering subscriber profile data such as an E-mail address via a telephone keypad is often tedious and error prone; and, verifying that a subscribed service is being directed to a legitimate entity is difficult.

After processing a subscriber profile registration request from a subscriber, notifying the subscriber that the registration request was, or was not, successful can be difficult. A common method of registration verification is for a service provider to send an E-mail message to a subscriber's E-mail address confirming the registration. The network routing information contained in the subscribing profile registration request is typically used for this purpose. However, lack of a corresponding non-delivery notification does not positively indicate successful delivery of the confirming E-mail message. To further complicate matters, if the E-mail address is invalid for any reason, a service provider typically has no way of notifying the subscriber to try to register again.

Using a telephone keypad to enter subscriber profile data is not a very accurate method of registering subscriber data. Subscriber profile data such as E-mail addresses are often quite long and typically include non-alphanumeric characters, such as the "at" sign (@) or the underscore (_); neither punctuation is represented on a telephone keypad. Therefore, the likelihood of error while typing in subscriber profile data on a telephone key pad is quite high. Similarly, speaking subscriber profile data to a live telephone operator or to a voice-recognition system is also error prone.

It is important to ensure that a subscribed service is being used by legitimate subscribers and similarly that the subscriber's profile customization data is not being altered by nonsubscribers. This is especially pertinent when the services being provided are proprietary or expensive. Conventional enhanced service platforms typically use an external web server to communicate with subscribers. The external web server typically communicates with subscribers via a direct Internet connection and with the enhanced service provider via an Intranet connection. While a direct Internet connection between subscribers and the external web server provides a convenient data exchange mechanism, the direct Internet connection is vulnerable to third party attack. Consequently, both the Internet and the Intranet connections must be regulated by expensive firewall devices in order to insure the security of the data transmitted to the enhanced service platform. These firewall devices are expensive, limit the number and types of communication protocols that may be used by the web server, and remain sensitive to attack by third parties.

What is needed is a subscriber profile registration system and method for registering subscriber profile data with a service provider without the data specification, verification, and notification issues commonly encountered by service provider platforms. Thus, a system is needed that provides a method for accurately entering subscriber profile data, provides a method to verify that subscriber profile data is being modified by a legitimate entity, and insures that the status of a successful or unsuccessful subscriber profile registration attempt is conveyed to the subscriber. Preferably, the system will also allow a subscriber to query subscriber profile data.

BRIEF DESCRIPTION OF THE DRAWINGS

Additional objects and features of the invention will be more readily apparent from the following detailed description and appended claims when taken in conjunction with the drawings, in which:

SUMMARY OF THE INVENTION

Figure 1:
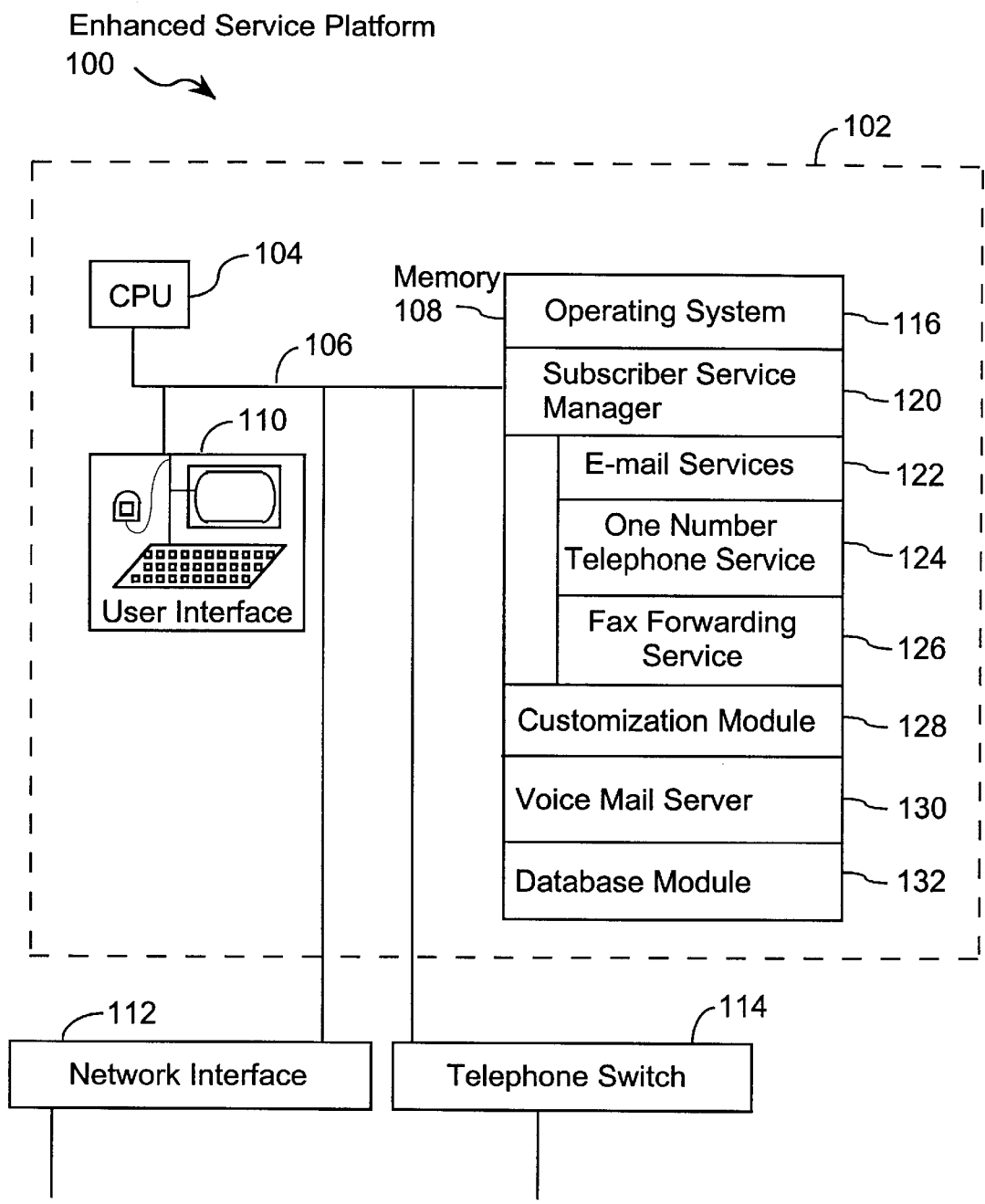
FIG. 1 is a block diagram of an embodiment of the enhanced service platform of the present invention, for subscriber profile registration with a service provider.

The present invention is used in conjunction with a system such as an Enhanced Service Platform 100 that maintains a profile for each subscriber of services provided by the platform. The system and method of the present invention provides a Subscriber Service Manager and a Customization Module for registering new subscriber profile data and/or customizing preexisting subscriber profile data. Customization includes selecting or deselecting subscriber services offered by the Enhanced Service Platform, or changing data entries in the subscriber profile. The information in the profile may include E-mail addresses, billing information, the names of the services the subscriber subscribes to, personal telephone numbers, and related data that is specific to the subscriber. Subscribers register new data and update previously stored data in their profile using the system and methods of the present invention. Further, subscribers may query their subscriber profile.

The Subscriber Service Manager is configured to receive various requests from the subscriber. In particular, the Subscriber Service Manager is configured to receive a request, termed a "transaction-ID request," to obtain permission to register and/or customize subscriber profile data. Upon receiving such a transaction-ID request, the Subscriber Service Manager supplies the subscriber with a transaction identifier, and stores a copy of the transaction identifier.

The Subscriber Service Manager is also configured to receive subscriber profile query requests. Upon receiving such a request, the Subscriber Service Manager supplies the subscriber with data from the subscriber's profile. Typically the query will be for the data contained in specific fields of the subscriber's profile.

The Customization Module is configured to receive a customization message. The customization message is a message originated by the subscriber that contains new profile data for registration or profile customization. The customization message may be an E-mail or a message generated by web based applications. When a valid customization message is received by the system, the message will specify the subscriber profile data to be registered, as well as the transaction identifier supplied by the Subscriber Service Manager. The Customization Module compares the transaction identifier in the customization message with the copy of the transaction identifier stored by the Subscriber Service Manager. Only if they match does the Customization Module register the subscriber profile data.

In a preferred embodiment, a subscriber first telephones the service platform and provides information that is used to verify that the subscriber has a privileged status that entitles the subscriber to use the platform's services. The subscriber then makes a transaction-ID request to register profile data such as an E-mail address. In response to the transaction-ID request, the service platform supplies a transaction identifier to the subscriber, and stores the transaction identifier, a time-stamp and the subscriber's telephone number for later retrieval. The subscriber then sends a customization message to the service platform requesting that the subscriber's profile be customized or updated with specified subscriber profile data. In addition to subscriber profile data, the customization message includes the transaction identifier. Upon receiving the subscriber's customization message, the Customization Module uses the transaction identifier to verify the customization request. If the customization request is verified, the Customization Module registers the subscriber profile data and/or customizes the subscriber's profile. Then, the Customization Module sends a registration notification to the subscriber, informing the subscriber that new data has been registered in the subscriber's profile and/or the subscriber's profile has been customized.

Preferably, the registration notification is sent to the subscriber's E-mail address, which is registered in the subscriber's profile. If the registration notification is not deliverable, the Customization Module will attempt to redeliver the registration notification. If a certain number of such delivery attempts fail, the service platform contacts the subscriber via a telephone number stored in the subscriber's profile to deliver a voice message indicating that the subscriber's registered E-mail address may be invalid or inoperative. In this manner, the service platform solves personal E-mail address specification, verification, and notification issues commonly encountered in subscriber profile registration processes.

DESCRIPTION OF THE PREFERRED EMBODIMENTS

The Enhanced Service Platform

Referring to FIG. 1, there is shown an embodiment of the Enhanced Service Platform 100 of the present invention. The Enhanced Service Platform 100 may be implemented using a programmed general-purpose computer system 102. The Enhanced Service Platform 100 may include:

one or more data processing units (CPUs) 104;

memory 108, which will typically include both high speed random access memory as well as non-volatile memory (such as one or more magnetic disk drives);

a network or other communication interface 112, for communicating with other computers and other devices;

a telephone interface 114, for receiving and forwarding telephone calls; and one or more communication busses 106, for interconnecting the CPU(s) 104, memory 108, user interface 110, network interface 112, and telephone switch 114.

The computer system's memory 108 stores procedures and data, typically including:

an operating system 116 for providing basic system services;

a subscriber service manager 120, for providing telephony services;

a customization module 128, for providing subscriber data registration and profile customization services;

a voice mail server 130, for receiving and forwarding voice messages; and a database module 132, for storing subscriber profile data.

The subscriber service manager 120 may include:

an E-mail services module 122, for providing E-mail services to subscribers;

a one number telephone service 124, for providing a plurality of one-number telephony services to subscribers; and a fax forwarding service 126, for forwarding faxes to subscribers via E-mail.

Subscriber Workstation and Interfaces to Enhanced Service Platform

Figure 2:
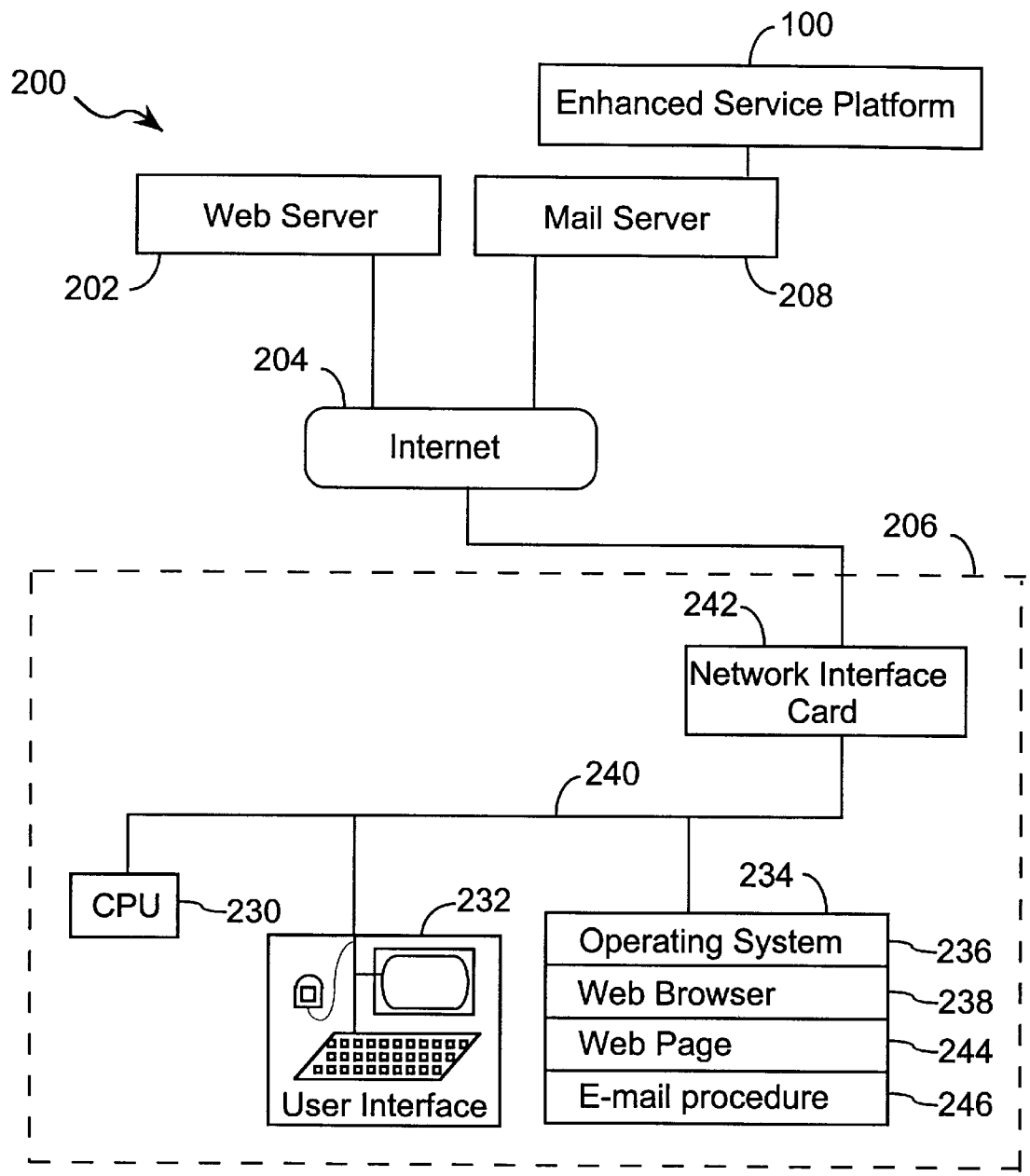
FIG. 2 is a block diagram of a subscriber workstation with web and mail server interfaces for entering subscriber profile data that is to be registered with a enhanced service platform or query registered profile data.

Referring to FIG. 2, there is shown a system 200 in which a subscriber workstation 206 communicates with an Enhanced Service Platform 100 via communications network 204 (such as the Internet) and a web server 202 or a mail server 208. In the preferred embodiment, only the mail server 208 is used to direct communications from subscriber workstations 206 to the enhanced service platform 100. The mail server 208 is preferably implemented as a separate server from the enhanced service platform 100, which helps to protect the enhanced service platform 100 from security attacks and avoids the need for an expensive firewall. In an alternate embodiment, the mail server 208 may be integrated with the enhanced service platform 100, in which case additional security equipment may be needed to prevent unwanted communications between other computers and the enhanced service platform 100. In yet other embodiments, no mail server 208 is provided and enhanced service provider 100 is directly coupled to the communications network 204.

In embodiments that include the web server 202, the web server 202 can be used to generate requests that are routed to the Subscriber Service Manager 120 and customization messages that are routed to the Customization Module 128.

The subscriber workstation 206 may include:
one or more data processing units (CPUs) 230;
a user interface 232, for inputting data;
memory 234, which will typically include both high speed random access memory as well as non-volatile memory (such as one or more magnetic disk drives);
a network interface card 242 for connecting communication network 204 to computer system 206; and
a bus 240 for interconnecting CPU 230, user interface 232, memory 234, and network interface card 242.

The subscriber workstation's memory 234 stores procedures and data, typically including:
an operating system 236 for providing basic system services;
a web browser 238 for providing a user interface for accessing communication network 204 and web server 202;
a web page 244 that provides options to the subscriber including generation of transaction-ID requests, subscriber profile query requests, and customization messages; and
an E-mail procedure 246 for sending and receiving E-mail messages.

In a preferred embodiment, web server 202 is implemented on a different computer platform from the enhanced service platform 100, although in alternate embodiments the web server 202 could be integrated with the enhanced service platform 100. The primary role of web server 202 is to help subscribers compose properly formatted subscriber requests. These requests are sent, by E-mail or other form of electronic communication, to enhanced service provider 100 for processing. For instance, web server 202 may provide subscriber workstations 206 with an HTML form that collects data from the user. This data is submitted to web server 202 as a CGI script, which is then executed by web server 202 to generate an E-mail message that contains the subscriber's request. The E-mail message is sent to Mail server 208. Mail server 208 screens out unauthorized communications and passes authorized E-mail messages from subscribers to enhanced service provider 100. Because E-mail messages are used to communicate with the enhanced service provider 100 rather than a direct Internet connection, in the embodiment shown in FIG. 2, the need for an expensive fire wall is obviated. Specific embodiments of mail server 208 include, but are not limited to, SMTP on a private network, UUCP on a private network, and UUCP on a dial-up network.

One of skill in the art will appreciate that the web page sent by web server 202 to subscriber workstations 206 may contain a Java applet or script that collects the data from the subscriber and composes an E-mail message that is sent from the subscriber's workstation to mail server 208.

Subscriber Service Manager

Figure 3A:
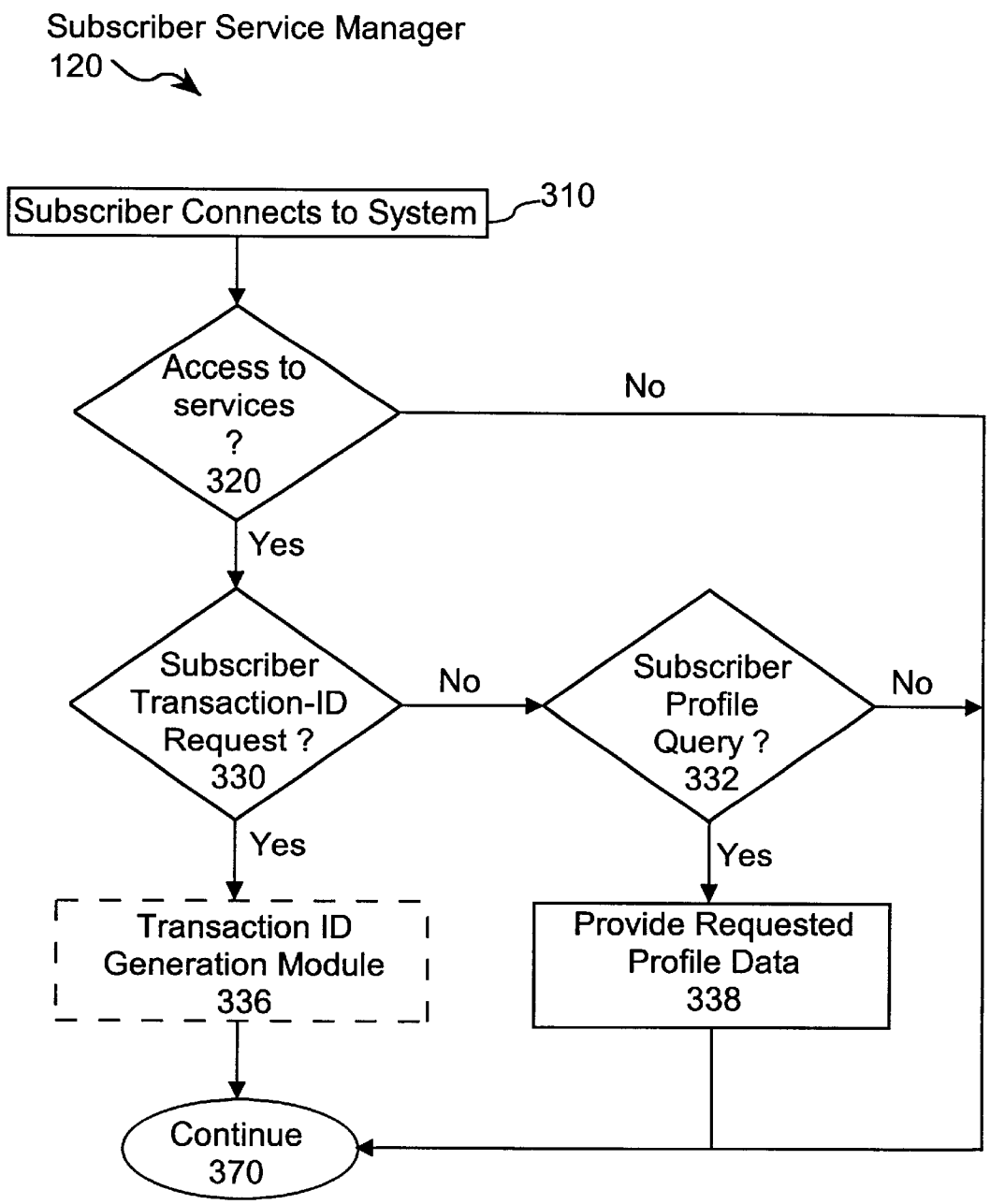
FIG. 3A is a flow diagram of an embodiment of a Subscriber Service Manager for managing subscriber requests at a service provider.

Referring to FIG. 3A, there is shown a flow diagram of an exemplary embodiment of Subscriber Service Manager 120. A subscriber communicates electronically 310 with Subscriber Service Manager 120. This communication 310 may be in the form of a telephone call, E-mail message, or a network connection. Either the subscriber or the Subscriber Service Manager 120 may originate connection 310. However, in a typical embodiment, the subscriber "logs on" to the Enhanced Service Provider 100 and thereby establishes the electronic communication with the Subscriber Service Manager.

The subscriber is first verified 320 to ensure that the subscriber has legitimate access to Subscriber Service Manager 120 services. When the subscriber does not have legitimate access to such services (320-No), the process may perform other steps 370 (e.g., logging information concerning the unsuccessful attempt and/or establishing a new account) before exiting. If the subscriber does have legitimate access (320-Yes), subscriber service manager 120 is placed in a state in which it will accept transaction-ID requests 330 from the subscriber. If the subscriber is not making a transaction-ID request (330-No), it is possible that the subscriber wishes to query his or her subscriber profile. If so (332-Yes), the Subscriber Service Manager provides specific fields of data that are requested by the subscriber 338. When the subscriber does elect to make a transaction-ID request (330-Yes), the transaction ID generation module 336 performs a number of steps to generate a transaction ID. If the subscriber is neither making a transaction-ID request (330-No) nor making a subscriber profile query (332-No), procedure 370 is called.

Figure 3B:
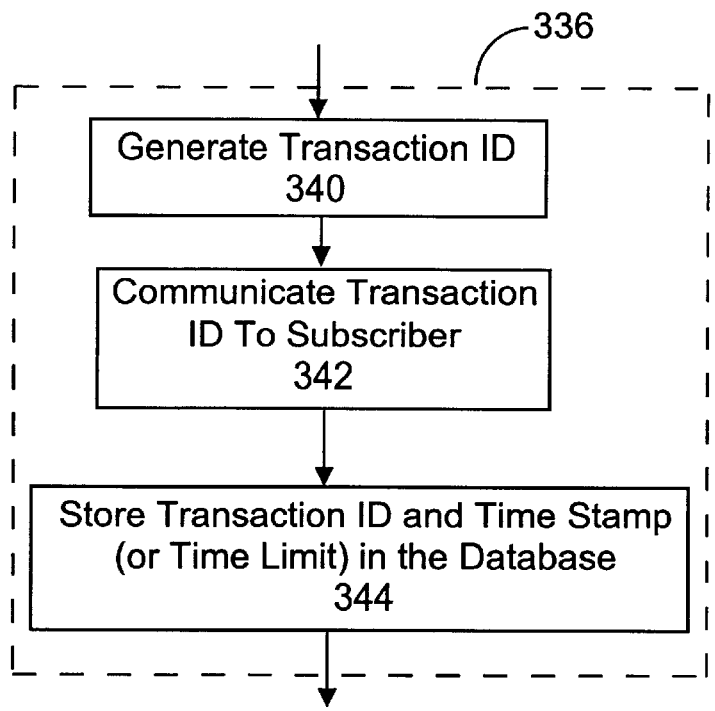
FIGS. 3B and 3C depict alternative embodiments for generating transaction IDs.

There are several alternative embodiments for how a transaction-ID request may be initiated (330) and a transaction ID generated (336). Referring to FIGS. 3A and 3B, if the subscriber has connected to Enhanced Service Platform 100 via a host web page, the option to make a transaction-ID request 330 may be presented to the subscriber as a graphic icon or menu option on a web page. Upon making a transaction-ID request (330-Yes), the Subscriber Service Manager 120 generates a transaction ID 340 (FIG. 3B) and communicates the transaction ID to the subscriber 342 by posting the transaction ID in a reply web page or E-mailing the transaction ID to a secure E-mail account associated with the subscriber. The Subscriber Service Manager 120 then stores the transaction ID and a time stamp in a database 344. The time stamp indicates when the transaction ID was created and is used to determine an expiration date for the transaction ID. Alternatively, a time limit value is stored with the transaction ID.

If the subscriber has connected to Enhanced Service Platform 100 via telephone, a similar process, to that described above, is used to obtain a transaction ID. In a preferred embodiment, options are presented to the subscriber in the form of voice directions, possibly including a predefined hierarchical menu for the subscriber to navigate. The subscriber may select options either by pressing keys on the telephone keypad, or by speaking an appropriate command or response if Subscriber Service Manager 120 includes a speech recognition driven interface. In the latter case, the system might ask an open question such as "What do you want to do?" The subscriber, in response, might say, "Make a transaction-ID request". Once the transaction-ID request is made (330-Yes), the Subscriber Service Manager generates a transaction ID 340 and recites it to the subscriber 342. Preferably, the transaction ID is recited twice, and the subscriber is given the option of having it recited additional times. Finally, the Subscriber Service Manager stores the transaction ID and a time stamp or a time limit value in a database 344.

In yet another embodiment, if the subscriber has contacted the system via E-mail, the transaction-ID request 330 may be encoded within the header or body of the E-mail message. In such an embodiment, communication of the transaction ID from the subscriber service manager 120 to the subscriber 342 is via a return E-mail message.

Figure 3C:
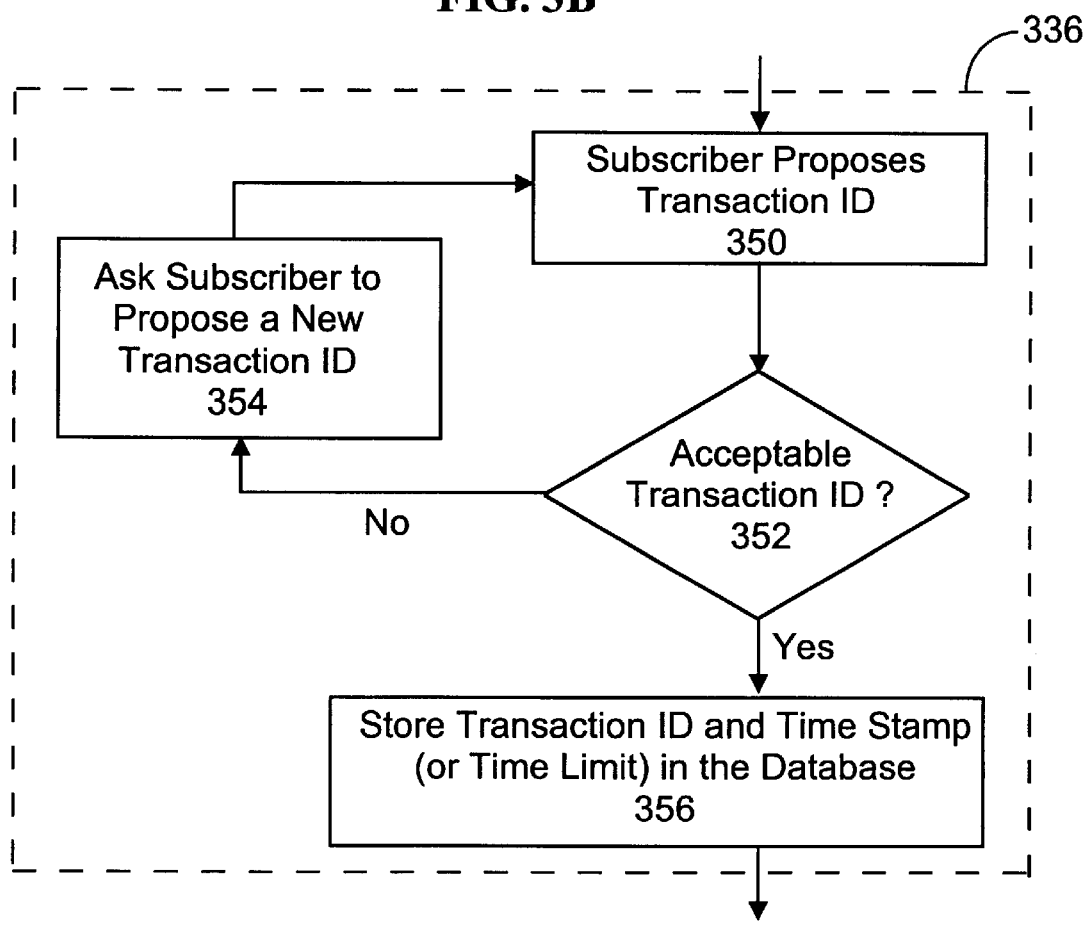

Referring to FIG. 3C, an embodiment of Subscriber Service Manager 120 provides the option to allow the subscriber to designate a transaction ID rather than have the Subscriber Service Manager generate the transaction ID. If the subscriber exercises this option, the subscriber first proposes a transaction ID 350. The Subscriber Service Manager determines if the proposed transaction ID is acceptable 352. If the transaction ID is acceptable (352-Yes), the transaction ID and a corresponding time stamp or time limit value is stored in a database 356. If the transaction ID is not acceptable, perhaps because it is already in use or because it is not in the correct format (352-No), the subscriber is prompted to propose a new transaction ID 354 or use the default transaction ID generation option of FIG. 3B.

Referring to FIG. 3A, once a transaction ID has been generated 336, other processing may be performed 370 before the Subscriber Service Manager 120 is finished.

In a preferred embodiment, the transaction ID is stored to verify subsequent customization messages directed to Enhanced Service Platform 100 (discussed in detail below). The stored time stamp can be used to facilitate administrative tasks. For instance, the time stamp can be used to flag any subscriber customization messages that remain "unverified," after a predetermined amount of time. The flagged entries can be logged or removed from a subscriber customization message queue.

Once the subscriber has obtained a transaction ID using transaction ID generation module 336, the subscriber may enter new data or update previously stored data in their profile. Ideally, the subscriber promptly creates and sends a customization message that includes the new or updated data along with the aforementioned transaction ID to enhanced service platform 100. In one embodiment, the message further includes the date in which the transaction ID was generated. As discussed in detail in the following section, if the customization message includes the wrong transaction ID, any data included in the message is not entered into the subscriber's profile.

The Customization Module

Figure 4A:
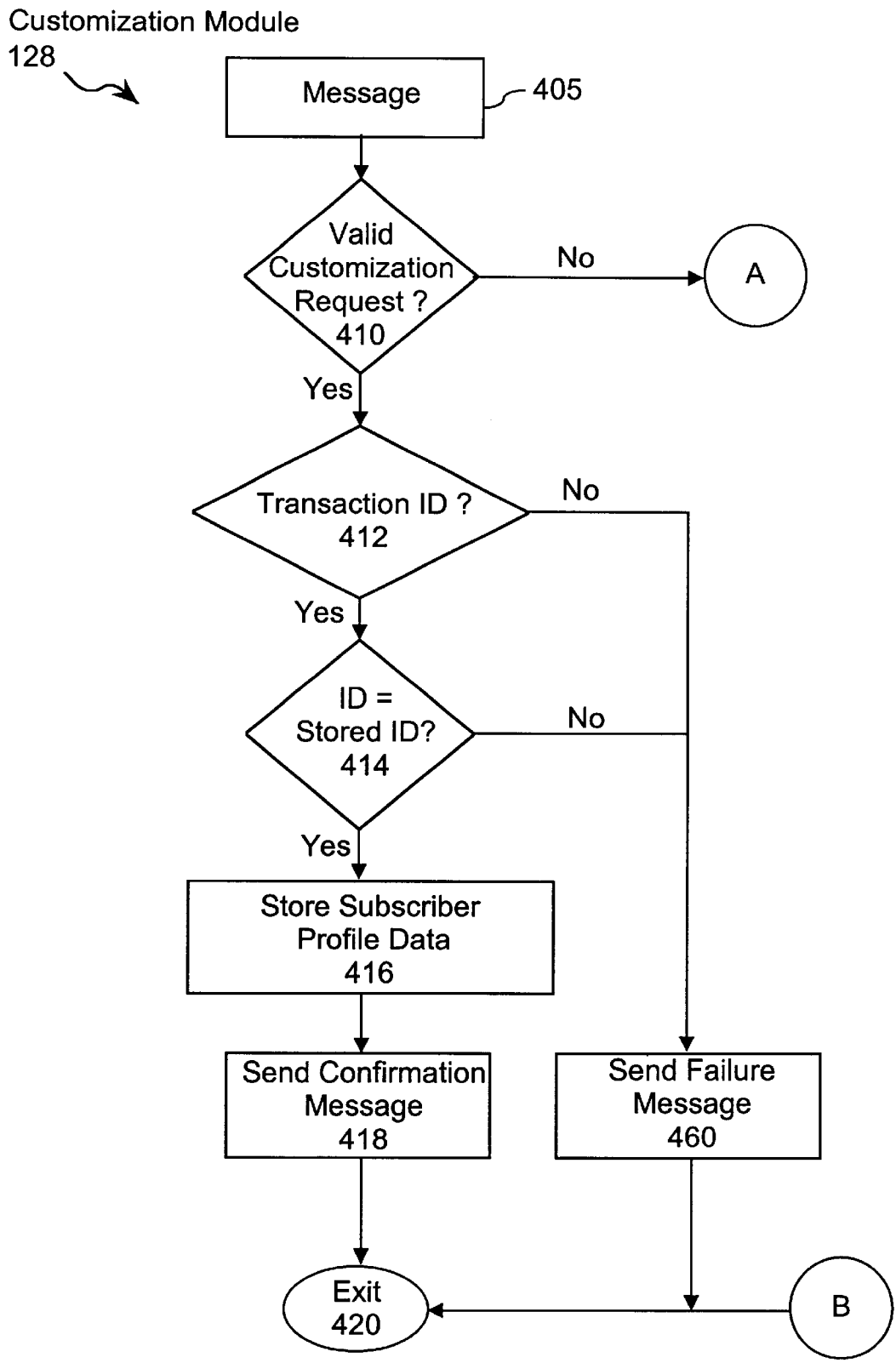
FIGS. 4A and 4B depict flow diagrams of a first embodiment of a Customization Module for processing a customization message.
Figure 4B:
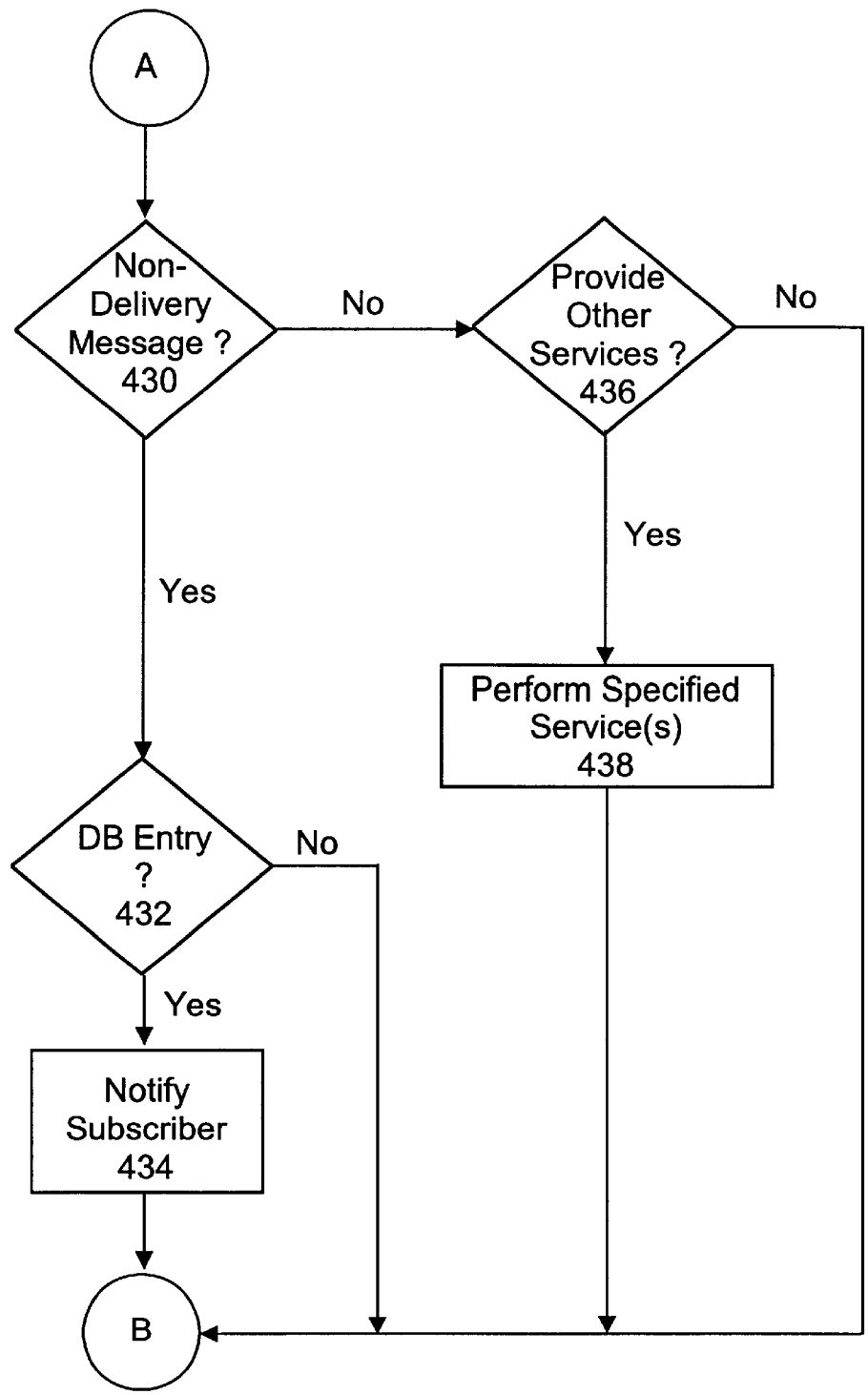

Referring to FIGS. 4A and 4B, there are shown high-level flow diagrams of an embodiment of Customization Module 128. The Customization Module 128 receives a Message 405. Message 405 may either be in the form of an E-mail message, the contents of a web based form, or other forms of electronic communication.

If Message 405 is a valid customization message from a legitimate subscriber to one of the Enhanced Service Platform's services (410-Yes), Customization Module 128 performs a set of steps to process the message. First, message 405 is queried for a transaction ID 412. The transaction ID is preferably a transaction ID assigned to the subscriber by the Subscriber Service Manager 120 as described in detail in the Subscriber Service Manager section.

If Message 405 is in the form of an E-mail message, the subscriber profile data may be indicated in the E-mail message in a variety of ways. For example, the data may be encoded in the body of the E-mail message, or encoded in the E-mail network routing information. One of skill in the art will appreciate that the data may or may not be encrypted and, further may be in the form of a high level language that contains complex instructions.

If a transaction ID is not found in the message (412-No), a Failure Message is sent 460 to the originator of the message and Exit procedure 420 is called. The Failure Message 460 may be in the form of a reply E-mail. Alternatively, if Customization Message 405 was generated using a web page, Failure Message 460 may be a failure notification that is posted on a reply web page.

If Message 405 contains a Transaction ID (412-Yes), Customization Module 128 queries database module 132 (FIG. 1) for a request record corresponding to the transaction ID contained in the message 414. Each request record has a stored copy of a transaction ID generated in response to a subscriber transaction-ID request by the Subscriber Service Manager. When a request record corresponding to the transaction ID in the message 405 is not located (414-No), a failure message is sent 460 and the process ends 420. If a request record is located containing a stored copy of a transaction ID that corresponds to the transaction ID in Message 405 (414-Yes), the Customization Module stores the subscriber profile data (also called customization data) 416 that is in Message 405. In some embodiments, if the subscriber profile data includes an E-mail address, the E-mail address may be validated before it is registered. For instance, the E-mail address may be tested to see that it meets basic E-mail address formatting requirements, and it may be compared against a "reject list" of E-mail addresses that Enhanced Service Platform 100 is programmed to not accept. Alternately, the E-mail address may be compared with a list of permitted domains that the Enhanced Service Platform 100 is programmed to accept. Other types of subscriber-supplied parameters within message 405, such as telephone numbers, zip codes, and spelling of text, may be verified in a similar manner. That is, the Customization Module may verify that at least certain ones of the subscriber-supplied parameters are each within a corresponding range of values, and may furthermore notify the subscriber when a subscriber-supplied parameter is not within the corresponding range of values. After the subscriber profile is updated with the customization data in Message 405, a confirmation message is sent to the subscriber 418 and the process ends 420.

Referring to FIGS. 4A and 4B, if message 405 is not a valid customization request (410-No), the Customization Module determines whether message 405 is a non-delivery message 430. If message 405 is a non-delivery message (430-Yes), a database is searched 432 for a record corresponding to the E-mail address to which delivery failed. When such a corresponding record is found, the system attempts to notify the subscriber 434. Typical notification 434 consists of leaving a voice message in the subscriber's voice mail box indicating that an E-mail address specified by the subscriber may be invalid or inoperative. Alternately, Customization Module 128 may telephone the identified subscriber to provide an appropriate notification (i.e., voice message) that an E-mail address specified by the subscriber may be invalid or inoperative. Then the process ends 420.

If Message 405 is not a valid customization request (410-No) and is not a non-delivery message (430-No), a determination is made as to whether message 405 is a request for other services 436, such as storing the message for a subscriber, or forwarding the message to a predetermined location. If Message 405 is, in fact, a request for such a service (436-Yes), the specified service is performed 438 and the process ends 420.

This exemplary process of the Customization Module 128 is not meant to be limiting in any way. This process shown is solely for purposes of explanation. Using teachings provided in this disclosure, persons skilled in the art of computer programming could implement the Customization Module 128 to provide the disclosed process in a variety of ways. For example, step 412, for determining if message 405 contains a transaction ID, could be performed outside of Customization Module 128.

Figure 5A:
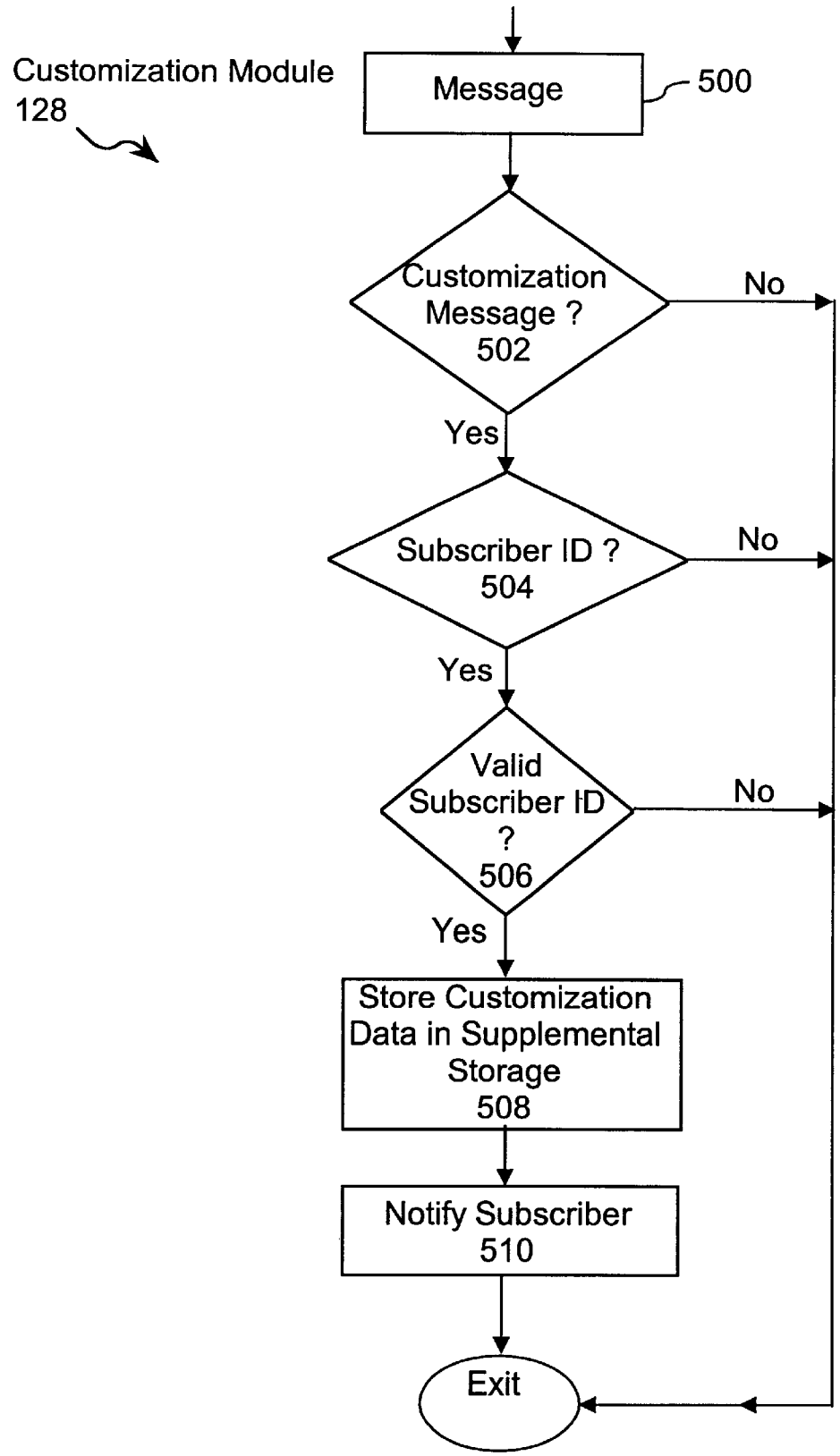
FIGS. 5A and 5B depict flow diagrams of alternative embodiments of a Customization Module for processing a customization message.
Figure 5B:
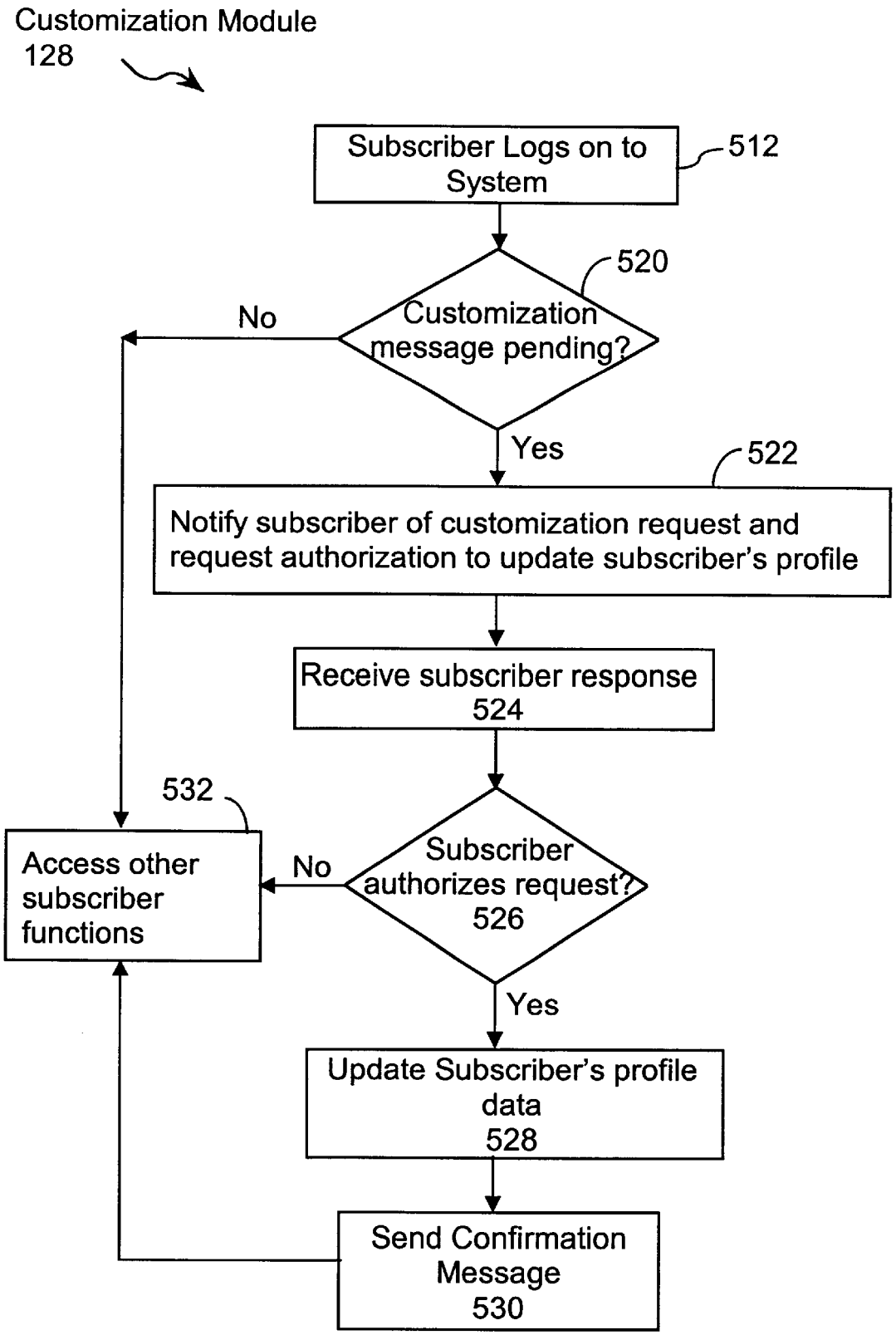

Referring to FIGS. 5A–5B, there are shown flow diagrams of a preferred embodiment of Customization Module 128. In this preferred embodiment, an alternative procedure can be used for registering subscriber profile data. When Message 500, received by Customization Module 128, is a customization message (502-Yes), the message is checked to see that it contains or otherwise specifies a subscriber and appropriate subscriber profile data (504). If the Message 500 is a customization message, then it should contain essential subscriber identification information (subscriber ID) such as a password, to gain access to the system. If insufficient subscriber identification information is provided in the message (504-No), it is rejected and the procedure terminates. If the subscriber ID specified by the message is invalid, the message is rejected (506-No). If the subscriber ID is valid (506-Yes) and the subscriber profile data within message 500 passes any syntax or other verifications at step 502, the subscriber profile data is stored 508, preferably in a supplemental storage area such as a database dedicated to pending customer profile updates and/or registration requests. Alternatively, the pending subscriber profile data could be stored in an extra field of the subscriber record.

The subscriber is optionally notified of pending customization updates by any one of several ways (510). For example, a "subscriber customization validation" or "subscriber registration validation" message could be left in a designated voice mail box or E-mail address that corresponds to the subscriber.

Referring to FIG. 5B, when a subscriber logs on to the enhanced service platform (512), the customization module determines whether a customization update is pending (520). If there is a pending customization update (520-Yes), the Customization Module notifies the subscriber of the pending customization update and requests authorization from the subscriber to process the pending customization update (522). If there is no pending customization update, access to other subscriber functions (532) is initiated. The subscriber responds, either verbally or by keypad and that response is received by the Customization Module (524). If the subscriber grants authorization (526-Yes), the customization data corresponding to the pending customization update is registered in the subscriber's profile (528). If the subscriber does not grant permission (526-No), access to other subscriber functions (532) is initiated. A confirmation message is then sent to the subscriber's E-mail address or voice mail (530).

The Database Record

Figure 6A:
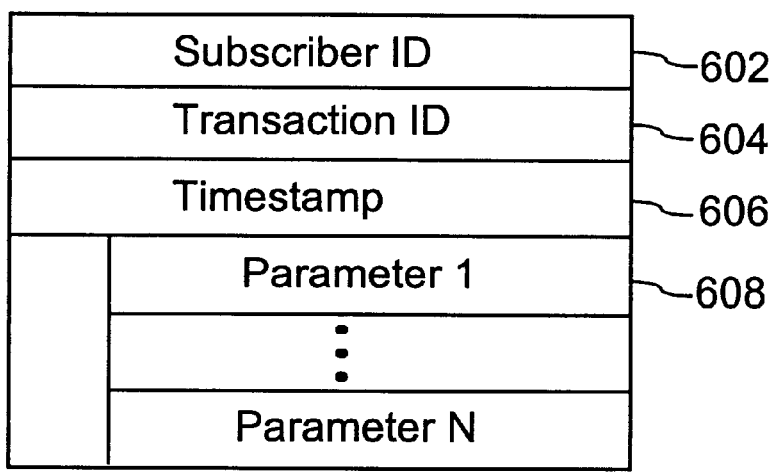
FIG. 6A and 6B depict block diagrams of alternative embodiments of a database record, for storing subscriber profile data that is to be registered with the platform.

Referring to FIG. 6A there is shown an embodiment of a database record 600. Database record 600 represents the data structure of a valid Message 405 (FIG. 4A). Database record 600 may include data such as a subscriber identification 602, a transaction ID 604, a time stamp 606, which represents the time when transaction ID 604 was generated, and one or more parameters 608 to be stored in the subscriber's profile. Parameters 608 are subscriber related data such as an E-mail address indicating where incoming E-mail is to be forwarded, a pager telephone number, a fax number, a forwarding telephone number, etc.

Figure 6B:
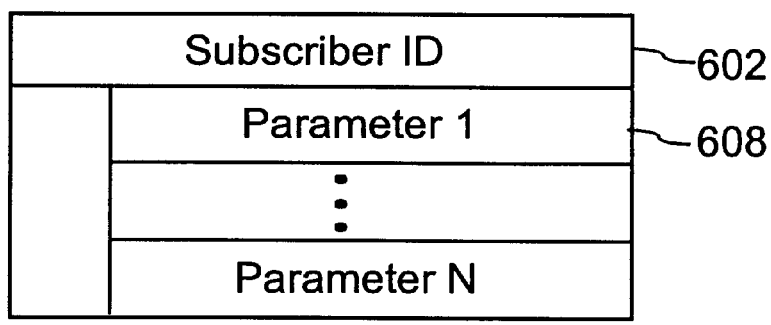

Referring to FIG. 6B there is shown an embodiment of a database record 650. Database record 650 represents the data structure of a valid Message 500 (FIG. 5A). Database record includes a subscriber identification 602 and one or more parameters 608 to be registered in the subscriber's profile.

Unified E-mail Address

Another preferred embodiment of the present invention is drawn to the case in which customization request 410 (FIG. 4A) or customization message 502 (FIG. 5A) is an E-mail message. In this preferred embodiment, the E-mail address that is used by a subscriber to send customization messages to the customization module is the same E-mail address that has been assigned to the subscriber for general E-mail services. Thus, the subscriber does not have to remember both his general E-mail address and a "customization" address. When the Enhanced Service Platform 100 receives an E-mail message that is addressed to a subscriber, the Platform automatically determines whether the E-mail message is a customization message. If the E-mail message is not a customization message, it is forwarded to the subscriber's in box with no further processing. Customization E-mail messages are processed by the Customization module 128 according to methods such as those described in FIGS. 4 and 5. The determination of whether an E-mail message is a customization message, to be processed by customization module 128, or just general content for the subscriber can be effected by any number of methods, including a special designation in the "subject" line of the E-mail message or by a particular tag present in the E-mail message.

Alternate Embodiments

The present invention can be implemented as a computer program product that includes a computer program mechanism embedded in a computer readable storage medium. For instance, the computer program product could contain the program modules and managers shown in FIG. 1. These program modules and managers may be stored on a CD-ROM, magnetic disk storage product, or any other computer readable data or program storage product. The software modules and managers in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A system for customizing a profile of a subscriber having access to a service platform comprising:

a subscriber service manager configured to receive a subscriber request at the service platform, the subscriber service manager upon receiving the subscriber request generating a transaction identifier, storing a copy of the transaction identifier, and communicating the transaction identifier to the subscriber; and a customization module configured to receive and process a customization message sent to the system, the received customization message including subscriber profile data and a transaction identifier; the customization module, upon receipt of the customization message, comparing the transaction identifier in the received customization message with the copy of the transaction identifier stored by the subscriber service manager, and registering the subscriber profile data when the transaction identifier and the copy of the transaction identifier correspond.

2. The system of claim 1, wherein the subscriber service manager is further configured to supply the subscriber with requested data from the profile when the subscriber makes a profile query request.

3. The system of claim 1, wherein the system is further configured to:
   set a time-limit for receiving the customization message, the time-limit corresponding to a time that the transaction identifier was determined;
   store in a database, in conjunction with the transaction identifier, the time-limit, and a subscriber identifier; and
   reject the customization message if it is not received within the time-limit.

4. The system of claim 1, wherein the system is further configured to send a confirmation message to a destination corresponding to the subscriber when the subscriber profile data is registered.

5. The system of claim 4, wherein when the customization module receives a non-delivery notification indicating that the confirmation message was sent to an invalid or inoperative destination, the system is configured to use a telephone number corresponding to the subscriber to deliver to the subscriber a corresponding voice message.

6. The system of claim 1, wherein the subscriber profile data includes one or more subscriber-supplied parameters and when the customization module receives a customization message, the customization module is further configured to:
   verify that each of the one or more subscriber-supplied parameters is within a corresponding range of values, and
   notify the subscriber when a subscriber-supplied parameter is not within the corresponding range of values.

7. The system of claim 1, wherein the customization message that is sent to the system is routed through a mail server.

8. A method for customizing a profile of a subscriber having access to a service platform, the method comprising steps of:
   receiving a subscriber request;
   determining and storing a transaction identifier in response to the subscriber request;
   communicating the transaction identifier to the subscriber;
   receiving a customization message, the customization message including subscriber profile data and a transaction identifier;
   comparing the stored copy of the transaction identifier with the transaction identifier in the received customization message; and
   registering the subscriber profile data when the stored copy of the transaction identifier corresponds to the transaction identifier in the received customization message.

9. The method of claim 8, wherein when a profile query request from a subscriber is received, the method further comprises supplying the subscriber with requested data from the profile of the subscriber.

10. The method of claim 8, wherein the method further comprises steps of:
    setting a time-limit for receiving the customization message, the time-limit corresponding to a time that the transaction identifier was determined;
    storing in a database, in conjunction with the transaction identifier, the time-limit, and a subscriber identifier; and
    rejecting the customization message if it is not received within the time-limit.

11. The method of claim 8, wherein when the subscriber profile data is registered, the method further comprises sending a confirmation message to a destination corresponding to the subscriber.

12. The method of claim 11, further comprising the step of communicating a non-delivery voice message to the subscriber when a non-delivery notification is received in response to the step of sending the confirmation message to the destination corresponding to the subscriber.

13. The method of claim 8, wherein the subscriber profile data includes one or more subscriber-supplied parameters, the method further comprising the steps of:
    verifying that each of the one or more subscriber-supplied parameters is within a corresponding range of values when a customization message is received, and
    notifying the subscriber when a subscriber-supplied parameter is not within the corresponding range of values.

14. The method of claim 8, further comprising the step of routing the customization message through a mail server.

15. A computer program product for use in conjunction with a computer controlled service platform, the computer program product comprising a computer readable storage medium and a computer program mechanism embedded therein, the computer program mechanism comprising:
    a subscriber service manager configured to receive subscriber requests at the service platform, the subscriber service manager upon receiving a subscriber request, determining a transaction identifier, storing a copy of the transaction identifier, and communicating the transaction identifier to the subscriber; and
    a customization module configured to receive and process a customization message sent to the service platform, the received customization message including subscriber profile data and a transaction identifier; the customization module, upon receipt of the customization message, comparing the transaction identifier in the received customization message with the copy of the transaction identifier stored by the subscriber service manager, and registering the subscriber profile data when the transaction identifier and the copy of the transaction identifier in the received customization message correspond.

16. The computer program product of claim 15, wherein the subscriber service manager is further configured to provide the subscriber with data from the profile when the subscriber makes a profile query request.

17. The computer program product of claim 15, wherein the subscriber service manager is further configured to:
    set a time-limit for receiving the customization message, the time-limit corresponding to the time that the transaction identifier was determined;
    store in a database, in conjunction with the transaction identifier, the time-limit, and a subscriber identifier; and
    reject the customization message if it is not received within the time-limit.

18. The computer program product of claim 15, wherein the customization module further configured to send a confirmation message to a destination corresponding the subscriber when the customization data is registered.

19. The computer program product of claim 18, wherein when the customization module receives a non-delivery notification indicating that the confirmation message was sent to an invalid or inoperative destination, the customization module is configured to use a telephone number corresponding to the subscriber to deliver to the subscriber a corresponding voice message.

20. The computer program product of claim 15, wherein the subscriber profile data includes one or more subscriber-supplied parameters and when the customization module receives a customization message, the customization module is further configured to:

verify that each of the one or more subscriber-supplied parameters is within a corresponding range of values, and notify the subscriber when a subscriber-supplied parameter is not within the corresponding range of values.

21. The computer program product of claim 15, wherein the customization message that is sent to the system is routed through a mail server.

22. A system for customizing a profile of a subscriber having access to a service platform comprising:

a customization module configured to receive a customization message sent to the system, the received customization message including subscriber profile data and a subscriber identifier that corresponds to a subscriber of the service platform; the customization module, upon receipt of the customization message, storing an indication of a pending subscriber customization request for the corresponding subscriber; and a subscriber service manager configured to receive a request to access the service platform and, when the subscriber is accessing the system and there is a pending subscriber profile customization request for the subscriber, to request authorization from the subscriber to register the subscriber profile data specified by the previously received customization message, and to register the profile data upon receipt of such authorization.

23. The system of claim 22, wherein the subscriber service manager is further configured to supply the subscriber with requested data from the profile when the subscriber makes a profile query request.

24. The system of claim 22, wherein the subscriber profile data includes one or more subscriber-supplied parameters and when the customization module receives a customization message, the customization module is further configured to:

verify that each of the one or more subscriber-supplied parameters is within a corresponding range of values, and notify the subscriber when a subscriber-supplied parameter is not within the corresponding range of values.

25. The system of claim 22, wherein the customization message that is sent to the system is routed through a mail server.

26. A method for customizing a profile of a subscriber having access to a service platform, the method comprising the steps of:

receiving a customization message, the customization message including subscriber profile data and a subscriber identifier that corresponds to a subscriber of the service platform;

storing an indication that the customization message has been received;

notifying the subscriber, when the subscriber is accessing the system, that the customization message has been received and requesting authorization from the subscriber to register the subscriber profile data; and registering the subscriber profile data upon receipt of such authorization.

27. The method of claim 26, wherein when a profile query request from a subscriber is received, the subscriber is supplied with requested data from the profile of the subscriber.

28. The method of claim 26, wherein the subscriber profile data includes one or more subscriber-supplied parameters, the method further comprising the steps of:

verifying that each of the one or more subscriber-supplied parameters is within a corresponding range of values when a customization message is received, and notifying the subscriber when a subscriber-supplied parameter is not within the corresponding range of values.

29. The method of claim 26, further comprising the step of routing the customization message through a mail server.

30. A computer program product for use in conjunction with a computer controlled service platform, the computer program product comprising a computer readable storage medium and a computer program mechanism embedded therein, the computer program mechanism comprising:

a customization module configured to receive a customization message sent to the service platform, the received customization message including subscriber profile data and a subscriber identifier that identifies a subscriber of the service platform; the customization module, upon receipt of the customization message, storing an indication of a pending subscriber profile customization request for the subscriber; and a subscriber service manager configured to receive a request to access the computer controlled service platform, and when the subscriber is accessing the service platform and there is a pending subscriber profile customization request for the subscriber, to request authorization from the subscriber to register the subscriber profile data specified by the previously received customization message, and to register the subscriber profile data upon receipt of such authorization.

31. The computer program product of claim 30, wherein the subscriber service manager is further configured to provide the subscriber with data from the profile when the subscriber makes a profile query request.

32. The computer program product of claim 30, wherein the subscriber profile data includes one or more subscriber-supplied parameters and when the customization module receives a customization message, the customization module is further configured to:

verify that each of the one or more subscriber-supplied parameters is within a corresponding range of values, and notify the subscriber when a subscriber-supplied parameter is not within the corresponding range of values.

33. The computer program product of claim 30, wherein the customization message that is sent to the computer controlled service platform is routed through a mail server.

* * * * *

UNITED STATES PATENT AND TRADEMARK OFFICE
CERTIFICATE OF CORRECTION

PATENT NO. : 6,266,690 B1  Page 1 of 1
APPLICATION NO. : 09/361676
DATED : July 24, 2001
INVENTOR(S) : Shankarappa et al.

It is certified that error appears in the above-identified patent and that said Letters Patent is hereby corrected as shown below:

(54) Title of application, please delete "ENHANCED SERVICE PLATFORM WITH SECURE SYSTEM AND METHOD FOR SUBSCRIBER PROFILE CUSTOMIZATION" and insert -- SECURE SYSTEM AND METHOD FOR SUBSCRIBER PROFILE CUSTOMIZATION --.

Signed and Sealed this

Twenty-fourth Day of October, 2006

JON W. DUDAS
*Director of the United States Patent and Trademark Office*